(12) United States Patent
Lee et al.

(10) Patent No.: US 6,408,302 B1
(45) Date of Patent: Jun. 18, 2002

(54) SYSTEM AND METHOD OF MAPPING DATABASE FIELDS TO A KNOWLEDGE BASE USING A GRAPHICAL USER INTERFACE

(75) Inventors: Gene W. Lee; Srikanth Subramanian, both of Plano, TX (US)

(73) Assignee: Davox Corporation, Westford, MA (US)

( * ) Notice: Subject to any disclaimer, the term of this patent is extended or adjusted under 35 U.S.C. 154(b) by 0 days.

(21) Appl. No.: 09/344,875

(22) Filed: Jun. 28, 1999

(51) Int. Cl.[7] .............................................. G06F 17/00
(52) U.S. Cl. ..................... 707/102; 709/313; 709/315
(58) Field of Search ............. 707/1–206; 379/201–207; 709/310–332; 706/45–50

(56) References Cited

U.S. PATENT DOCUMENTS

| | | | |
|---|---|---|---|
| 5,418,943 A | * | 5/1995 | Borgida et al. ................. 707/4 |
| 5,499,371 A | * | 3/1996 | Henninger et al. ......... 707/102 |
| 5,615,362 A | * | 3/1997 | Jensen et al. ............... 707/103 |
| 5,706,506 A | * | 1/1998 | Jensen et al. ............... 707/103 |
| 5,841,852 A | * | 11/1998 | He ............................. 379/207 |
| 5,907,537 A | * | 5/1999 | Papineau et al. ........... 379/201 |

* cited by examiner

*Primary Examiner*—David Jung
(74) *Attorney, Agent, or Firm*—Bourque & Associates, PA

(57) ABSTRACT

A system and method for mapping a plurality of data base fields from an arbitrary ODBC-compliant data base to a plurality of attributes in a knowledge base having a known data attribute format is provided. The system includes a data base selection interface displayed on a display associated with a system user. The data base selection interface is configured to allow a system user to select the data base to map to the knowledge base having a known data attribute format. The system also includes a data attribute mapping interface, which is also displayed on the system user display. The data attribute mapping interface is configured to display a plurality of data attributes included in the knowledge base and to allow the system user to select at least one data attribute to map to at least one data field in the arbitrary data base to be converted. Also included is an edit field mapping interface, which is also displayed on the system user display. The edit field mapping interface allows at least one selected data attribute to be displayed and allows the system user to select a data base field to map to each displayed data attribute. Finally, the system includes a data map memory for storing the mapped data base fields.

11 Claims, 5 Drawing Sheets

SYSTEM AND METHOD OF MAPPING DATABASE FIELDS TO A KNOWLEDGE BASE USING A GRAPHICAL USER INTERFACE

FIELD OF THE INVENTION

The present invention concerns the field of computer telephony integration (CTI) and in particular, the invention provides a graphical user interface (GUI)-enabled system and method of mapping arbitrary database schemes into a knowledge base having a known data format.

BACKGROUND OF THE INVENTION

Many businesses and customer service organizations utilize telephone call centers to place outbound telephone calls and receive inbound telephone calls to and from customers or potential customers, for example, for credit collection or telemarketing. Computer telephony integration (CTI) has allowed telephone call centers to more efficiently handle both outbound telephone calls and inbound telephone calls. These computerized telephony systems typically include an automated dialer that automatically places outbound telephone calls and an automatic call distributor (ACD) that handles large volumes of inbound telephone calls. These, and other components of the telephony system, are controlled by a telephone call center management system. One example of a system and method for integrating outbound and inbound telephone calls is disclosed in greater detail in U.S. Pat. No. 5,586,179 issued Dec. 17, 1996, assigned to the assignee of the present invention and incorporated herein by reference.

Telephone call centers also include a number of audio head sets and data terminals used by agents or operators to communicate with the called parties and calling parties. Using the data terminal, such as a PC, an agent can view and/or enter call record data pertaining to the party (e.g., the customer or potential customer) and the transaction being made. The telephone call center management system typically controls the allocation of the agents to the inbound and/or outbound telephone calls and the management of the data presented to the agents and entered by the agents. The processing of a series of telephone calls (inbound or outbound) in a telephone call center is often referred to as a call campaign.

To initiate an outbound call campaign, the telephone call center management system generates a predefined, sorted customer call list having a number of customer call records (CCRs) including, for example, a telephone number to be called, a name, address, account number, and other information pertaining to the customer and the transaction. The CCRs pertaining to an outbound call campaign are typically downloaded from a call record source, such as a host computer, and are organized, e.g., according to the calling time, into the call lists. The telephony system reads a CCR from the predefined call lists and dials the telephone number, either automatically or at the direction of an agent. If a live party answers a call, the connected call is then routed to an available agent and the call center management system displays the information from that CCR on a display at the assigned agent's terminal. The agent can then enter additional information and the CCR in the call list will be updated accordingly either during or upon completion of the outbound telephone call.

Outbound telephone calls are typically grouped according to a particular application. One example of an outbound telephone call campaign is in the field of telemarketing where the agents or telemarketing service representatives (TSRs) market products and/or services to the called party and take orders for the products and/or services. In this example, the telephone calls may be grouped according to the type of product or service that is being marketed.

Typically, a call center offers its services to many numbers of clients. Thus, in the example of an outbound call campaign, a call center may need to initiate outbound calls for a number of different companies. The call center would obtain CCRs from the company contracting with the call center, which would include the contact information related to the customers or potential customers of that company. Call centers customarily receive the CCRs from their clients in electronic form and, quite often, download them from host computers maintained by the clients. CCRs are almost universally maintained in some form of data base. However, as can be appreciated, each call center client may retain its CCRs in any database format it desired. Thus, if a call center is going to offer its services to a number of clients, it must have a ready means of converting the CCR information from the client's data base format into a format that is compatible with the call center's CTI system.

In the past, the conversion of data has typically been performed by exporting the client's data base into a fixed format flat file that could be used by the CTI system. However, this would require the assistance of an individual skilled in the art of computer data bases and would require a conversion program or would require a computer program to interpret and convert the data from the original format to a format usable by the call center. Alternatively, the CTI system could be customized to read directly into the client's data base. However, this would require a custom version of the CTI system software and/or a custom computer program to perform such conversion for each client contracting with a particular call center. An example of such an automated data format conversion system is disclosed in U.S. Pat. No. 5,778,359.

Accordingly, there is a need for a system and method of converting information stored in an arbitrary data base format into a knowledge base having a known data format, which does not require the assistance of a computer information system specialist or a special computer conversion program each time data base information is required. It would also be advantageous to provide such a system and method in a graphical user interface format, which could be operated by call center personnel, such as a call center supervisor.

SUMMARY OF THE INVENTION

The disclosed invention provides a system and method that overcomes many of the deficiencies found in the prior art, including but not limited to the necessity for an individual skilled in the art of computer data base management to convert data base information from one format to another. Specifically, an automated system and method for mapping a plurality of data base fields from an arbitrary ODBC-compliant data base to a plurality of attributes in a knowledge base having a known data attribute format is provided. The system includes a data base selection interface displayed on a display associated with a system user. The data base selection interface is configured to allow a system user to select the data base to map to the knowledge base having a known data attribute format. The system also includes a data attribute mapping interface, which is also displayed on the system user display. The data attribute mapping interface is configured to display a plurality of data attributes included in the knowledge base and to allow the system user to select at least one data attribute to map to at least one data field in the arbitrary data base to be converted.

Also included is an edit field mapping interface, which is also displayed on the system user display. The edit field mapping interface allows at least one selected data attribute to be displayed and allows the system user to select a data base field to map to each displayed data attribute. Finally, the system includes a data map memory for storing the mapped data base fields.

Also provided is an automated method for mapping a plurality of data base fields from an arbitrary ODBC-compliant data base to a plurality of attributes in a knowledge base having a known data attribute format. The method begins by providing a data base selection interface on a display associated with a system user. The data base selection interface displays at least one user-selectable data base to map to the knowledge base having the known data attribute format. Next, a data base to map is selected by a system user from the list of user-selectable data bases displayed on the data base selection interface. Then, a data attribute mapping interface is provided on the system user display. The data attribute mapping interface displays a plurality of data attributes included in the knowledge base. The method continues by selecting at least one displayed data attribute to map to at least one data field in the arbitrary data base. Then, an edit field mapping interface is provided on the system user display. The edit field mapping interface displays the selected data attribute. Next, a system user selects a data base field map to each displayed data base attribute. Finally, each data base field mapped to each data attribute is stored in a data map memory.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

In the following detailed description, the invention will be described making particular reference to a telephone call center including a CTI system. However, this is merely one example of an application of the system and method of the present invention and is not to be considered to limit the invention.

Figure 1:
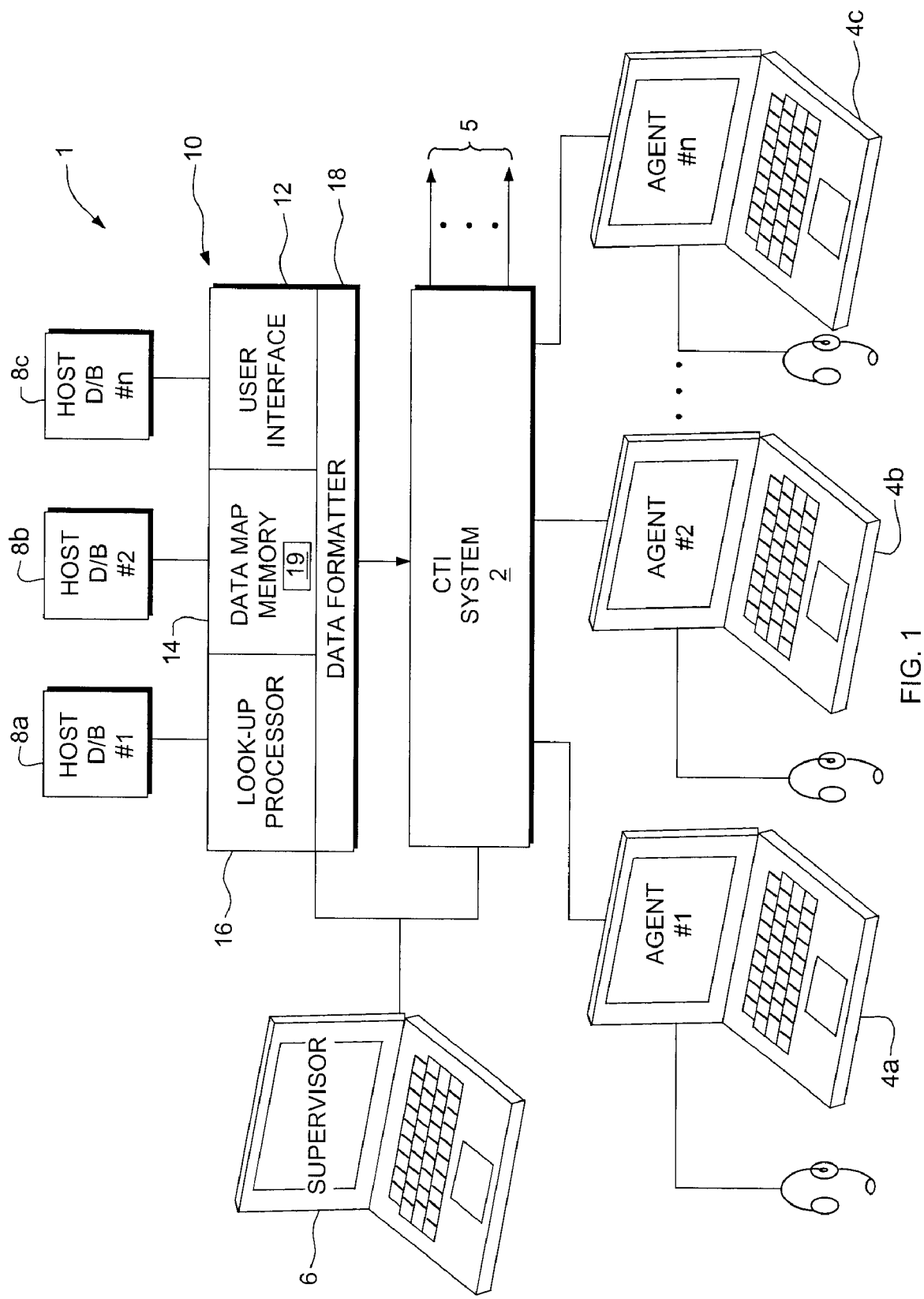
FIG. 1 is a block diagram of a call center including an automated data base mapping system according to the present invention.

A call center 1, FIG. 1, including an automated data base mapping system 10 according to the present invention is coupled to and used with, in the exemplary embodiment, a computer telephony integration (CTI) system 2, which, as is well known to those skilled in the art, is used to initiate outbound telephone calls using a plurality of outbound telephone trunks 5. The CTI system 2 places outbound calls according to a plurality of customer call records (CCRs) which it receives from one or more host data base 8. The call center 1 includes a plurality of call center agents 4 who interface with connected parties (not shown) via the CTI system 2 when a live party answers an outbound call placed by the CTI system. The CTI system is monitored and managed by a call center supervisor 6 while the CTI system is in operation. The present invention can also be used with a CTI system 1 handling inbound calls.

As indicated earlier, each host data base 8 includes a plurality of customer call records which are used by the CTI system to place outbound calls or to otherwise access data of calling (inbound calls) parties. Accordingly, each CCR includes contact information regarding a customer or potential customer, such as the customer's name, address, transaction record information, and one or more telephone numbers that can be dialed by the CTI system 2. However, as also indicated above, the customer contact information included in each CCR may vary depending on the design of the data base used to maintain the CCRs by the various clients of the call center. Therefore, in order to properly place an outbound call or handle an inbound call, the CTI system must be configured to retrieve the proper customer contact information from the appropriate place in each CCR.

The present invention provides an automated system which insures that a call center CTI system or other system interfaced with or using the automated database mapping system 10 of the present invention retrieves the proper information from a CCR in order to place an outbound call or handle an inbound call. The disclosed invention accomplishes this by providing an automated system 10 for mapping a plurality of data base fields from an arbitrary ODBC-compliant data base to a plurality of attributes in a knowledge base having a known data attribute format. The disclosed automated database mapping system 10 is enabled using a plurality of graphical user interface (GUI) screens 12, which are displayed on a system user display, such as a display associated with system supervisor 6, and allow a system user to map a data base without requiring any technical computer programming skills.

The automated database mapping system 10 includes a data map memory 14, a look-up processor 16 and an optional data formatter 18. The data map memory 14 is used to store a database-to-knowledge base map 19, which is created by a system user using the present invention. In response to a call for information stored as an attribute in the knowledge base, the look-up processor 16 accesses the data map memory, retrieves the information from the data map associated with the desired data attribute and retrieves the information from the data base field in one or more database 8 that is mapped to the desired data attribute. In the event that the information retrieved from the database 8 needs to be reformatted for use by the CTI or other system, the data formatter 18 is provided, which converts retrieved data into an appropriate format.

Figure 2:
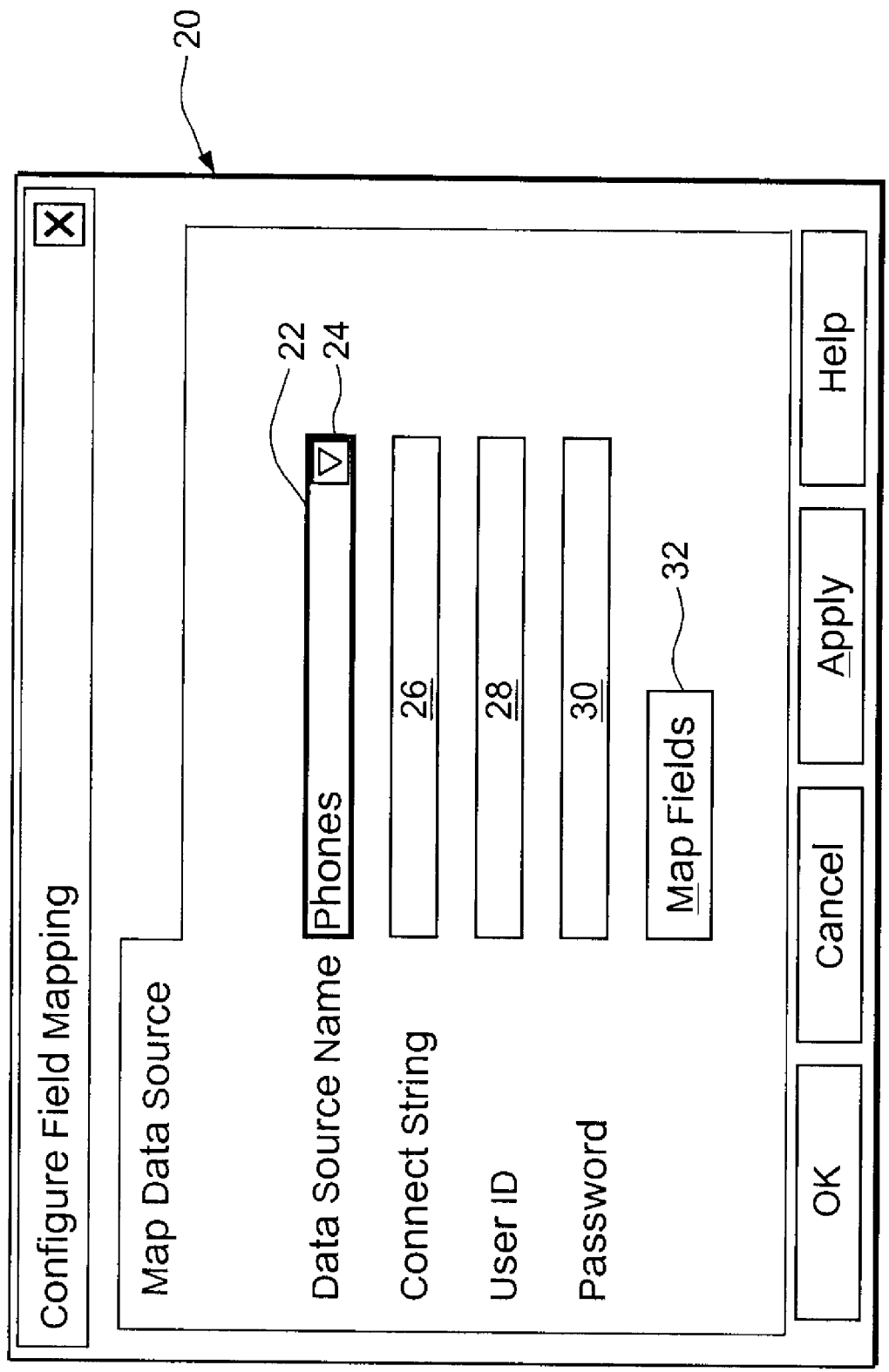
FIG. 2 is a computer screen display showing a data base selection interface according to one embodiment of the invention.

FIG. 2 shows a data base selection interface 20, which is displayed on a system user display. The data base selection interface 20 is configured to allow the system user to select a data base to map to the knowledge base. In the data base selection interface 20, the system user must provide information that allows the system to access the desired data base. In order to access a data base, the data base must have an ODBC data source name (DSN). In addition, in one embodiment, a system user ID and password must already exist in the data base before the user can input information in the data base selection interface. The data base selection interface includes a data source name (DSN) field 22, where the system user either enters an ODBC DSN for the desired data base or uses the pull-down list icon 24 to display a list of available DSNs (not shown) and selects one of the available data bases by its DSN.

In alternative embodiments, if required by the data base being mapped and/or the data base driver, the data base selection interface provides additional input fields. The first additional input field is a connect string field 26, where a connect string may be entered by a system user. A connect string is additional data that a data base driver may require when connecting to the data base. For example, INTERSOLV DataDirect drivers require the data base and server names. Additionally, if required, a user ID may be entered in a user ID field 28. Likewise, if required, a user password may be entered in a password field 30. Once a data base to map is identified, than the system user clicks the Map Fields button 32 to continue the mapping process.

By selecting the Map Fields button 32, the system provides a data attribute mapping interface 40 (FIG. 3) on the system user display. The data attribute mapping interface 40 is configured to display a plurality of data attributes included in the knowledge base and allows the system user to select at least one displayed data attribute to map to at least one data field in the data base being mapped.

The data attribute mapping interface 40 includes a data base table field 42 and a knowledge base attribute field 44. The data base table field 42 allows the system user to specify a data base table to use. The system user either enters a data base table to use in the data table base field 42, or selects a table name from a pull-down list.

Figure 4:
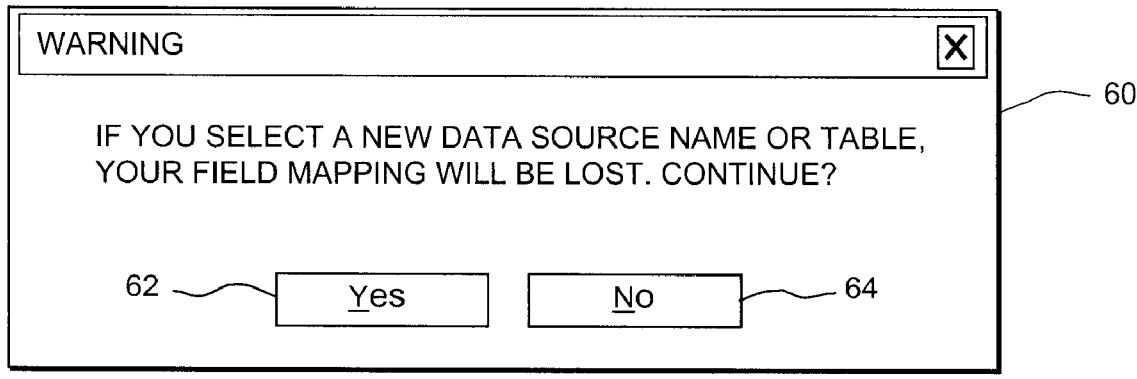
FIG. 4 is a warning dialogue box, which warns a system user that existing field mappings may be lost.

If the system user is changing the table name from the one used previously, the automated data base mapping system will display a warning message, such as the warning message provided in warning window 60 of FIG. 4. The warning message advises a system user that the selection of a new data source table will overwrite previously entered data base field mappings. The warning window 60 includes user selectable buttons 62 and 64, which allow the system user to acknowledge the warning and either continue with the desired data base mapping or stop.

Returning to FIG. 3, the map attributes field 44 displays a list of attributes 46 associated with the knowledge base as well as a user defined label 48 and data base field 50 that is mapped to each mapped knowledge base attribute. Since the example of the automated data base mapping system being described is used in conjunction with a CTI system configured to place outbound telephone calls, the attribute mapping field may also include an indication as to whether a data base field that is mapped to a knowledge base attribute is dialable 52.

The data attribute mapping interface 40 also includes user selectable buttons, which facilitate the data base mapping process. These user selectable buttons include edit button 53, unmap button 54, unmap all button 55, and dial order button 56, all of which will be discussed in more detail below.

Figure 5:
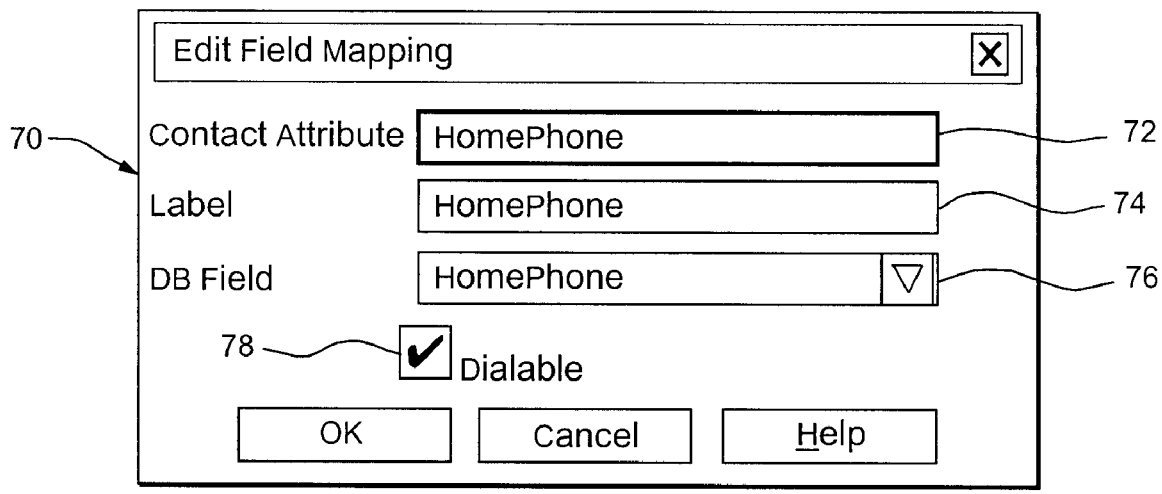
FIG. 5 shows an edit field mapping interface display according to one embodiment of the present invention.
Figure 6:
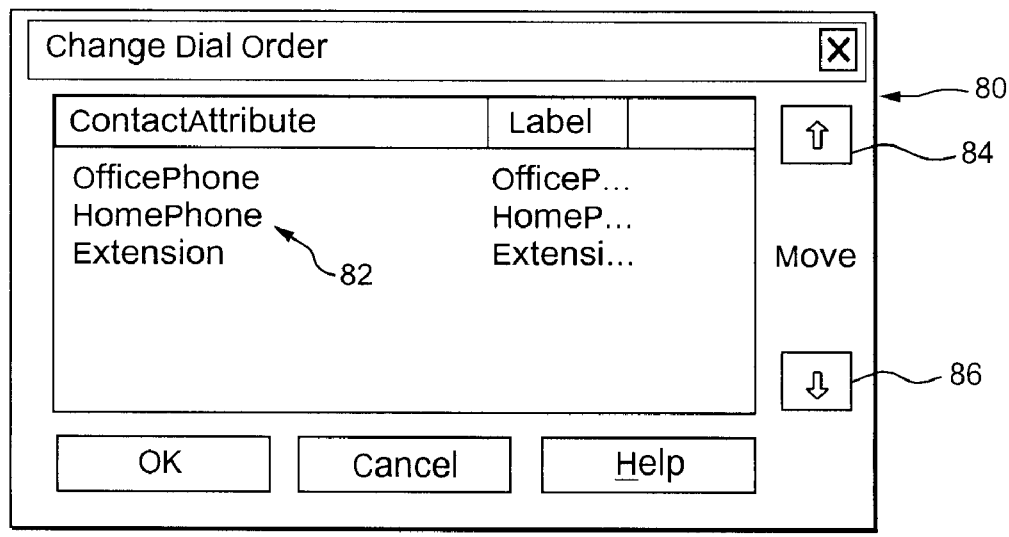
FIG. 6 shows a change dial order dialogue box according to another embodiment of the present invention.

To map a knowledge base attribute to a field in the data base being mapped, the system user selects a knowledge base attribute from the attribute list 46 and then selects the edit button 53. This action displays an edit field mapping interface 70 (FIG. 5) on the system user display. The edit field mapping interface 70 displays the selected knowledge base attribute in data attribute field 72, which is a read-only field. The edit field mapping interface also includes an attribute label field 74, where the system user is free to input a label associated with the knowledge base attribute selected. Further, the edit field mapping interface includes a data base field selection field 76, where the system user chooses from a pull-down list of available fields in the data base being mapped. Finally, the edit field mapping interface may include one or more check boxes, such as check box 78, which may be selected to indicate whether a data base field being mapped is dialable. This would be appropriate for a data base mapping system configured for use in connection with a CTI system. However, other properties of data base fields that are appropriate to other applications of this system may be substituted.

Returning to FIG. 4, a system user can unmap one or more attributes at any time from the data attribute mapping interface 40. To unmap an individual knowledge base attribute, the system user selects the knowledge base attribute from attribute list 46. Then, the system user clicks the unmap button 54. This unmaps the selected knowledge base attribute. To unmap all assigned attributes, the system user simply uses the unmap all button 55.

Figure 3:
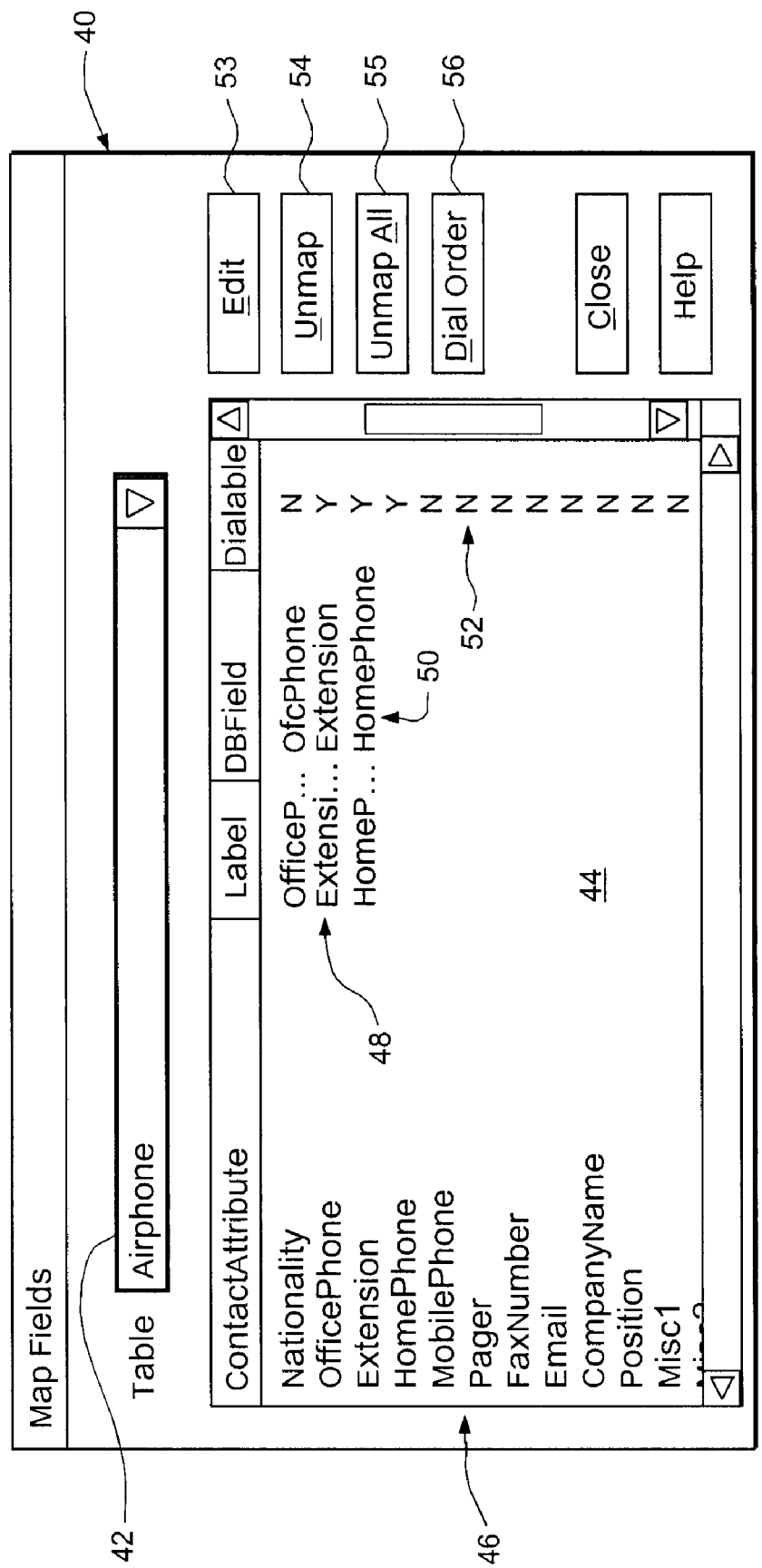
FIG. 3 is a screen display showing a data attribute mapping interface according to the teachings of the present invention.

In the exemplary embodiment of the invention the system may include the ability to allow a system user to change the order of telephone numbers to be dialed if the data base being mapped includes data base fields for more than one telephone number associated with a CCR. This is accomplished by selecting the dial order button 56 on the data attribute mapping interface 40 (FIG. 3). Selecting a dial order button triggers the display of a change dial order interface 80 on the system user display. A change dial order interface 80 provides a list of the knowledge base attributes 82 in a hierarchical fashion. In order to change the order that the system will retrieve the knowledge base attributes, the system user simply selects a displayed attribute and clicks on the move buttons 84 and 86 in order to vary the position of the selected knowledge base attribute in the attribute list 82. Thus, when the look up processor attempts to look up a telephone number to dial, it will access the knowledge base attributes in the order that they are provided in the knowledge base.

Figure 7:
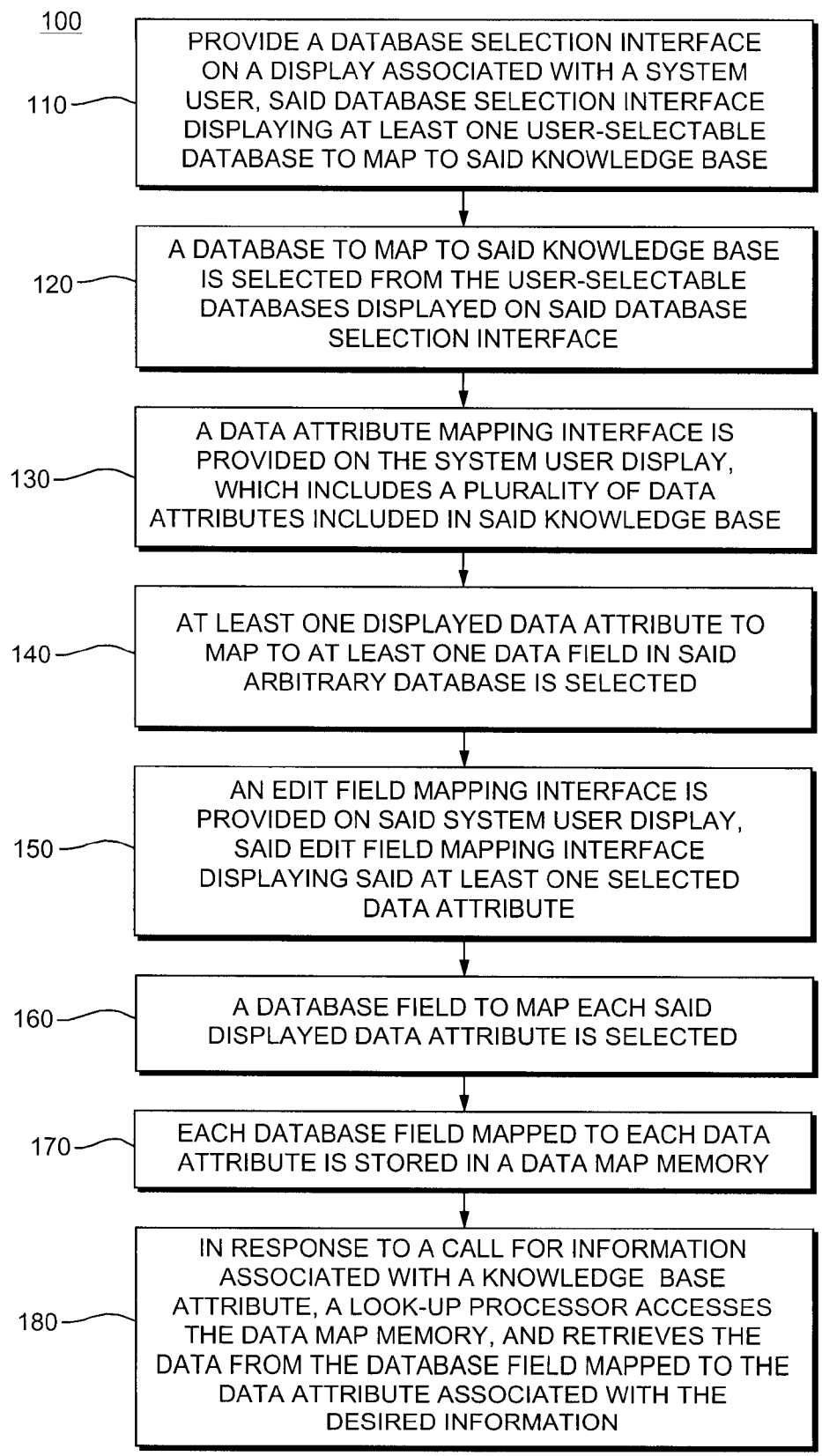
FIG. 7 is a flow diagram showing the steps of an automated method for mapping a plurality of data base fields from an arbitrary ODBC-compliant data base to a plurality of attributes in a knowledge base having a known data attribute format according to the present invention.

Turning now to FIG. 7, an automated method of mapping a plurality of data base fields from an arbitrary ODBC-compliant data base to a plurality of attributes in a knowledge base having a known data attribute format is disclosed. The method 100 begins by providing a data base selection interface on a display associated with a system user, step 110. The data base selected interface displays at least one user-selectable data base to map to the knowledge base having the known data attribute format. Then, a data base to map to the knowledge base is selected from the user-selectable data bases displayed on the data base selection interface, step 120.

In step 130, a data attribute mapping interface is provided on the user display. The data attribute mapping interface displays a plurality of data attributes included in the knowledge base. The system user then selects at least one displayed data attribute to map to at least one data field in the arbitrary data base, step 140.

In step 150, an edit field mapping interface is provided on the system user display. The edit field mapping interface displays the selected data attribute. In step 160, a data base field to map to each displayed data attribute is selected. Finally, in step 170, each data base field mapped to each data attribute is stored in a data map memory.

In operation, a look-up processor, in response to a call for information stored as an attribute in the knowledge base, accesses the data map memory, retrieves the data map associated with the desired data attribute and retrieves the information from the data base field that is mapped to the desired data attribute. A data formatter may then take the retrieved data and re-format it into a format desired for use in the CTI system. For example, non-numberic characters (e.g. "(", "-", etc.) may be stripped from phone numbers stored in CCRs.

Accordingly, an automated system and method for mapping a plurality of data base fields from an arbitrary ODBC-compliant data base to a plurality of attributes in a knowledge base having a known data attribute format is provided. The disclosed system and method is GUI-enabled and allows a system user having little or no formal computer training to perform a data base map. Although disclosed making particular reference to a system and method used in connection with a CTI system, the disclosed system and method is readily adaptable to a variety of implementations. Therefore, modifications and substitutions by one of ordinary skill in the art, including adaptations of the system and method for use in other application are considered to be within the scope of the present invention, which is not to be limited except by the claims which follow.

What is claimed is:

1. An automated system for mapping a plurality of database fields from an arbitrary ODBC-compliant database to a plurality of attributes in a knowledge base having a known data attribute format for use in a computer system, said automated database mapping system comprising:

a database selection interface displayed on a system user display, said database selection interface for allowing a system user to select a database to map to said knowledge base having said known data attribute format;

a data attribute mapping interface displayed on said system user display, said data attribute mapping interface for displaying a plurality of data attributes included in said knowledge base and to allow said system user to select at least one displayed data attribute to map to at least one data field in said arbitrary database;

an edit field mapping interface displayed on said system user display, said edit field mapping interface configured to display said at least one selected data attribute and to allow said system user to select a database field to map to each said displayed data attribute; and data map memory for storing each of said database fields mapped to each said data attribute.

2. The system of claim 1 further comprising a lookup processor, responsive to a call for data associated a data attribute associated with said knowledge base of known data format, for searching said data map memory, identifying said database field mapped to said data attribute and retrieving data included in said database field mapped to data attribute.

3. The system of claim 1, wherein said computer system comprises a computer telephony integration (CTI) system.

4. The system of claim 1, wherein said data attribute mapping interface displayed on said system user display is further configured to display at least one database field mapped to said at least one displayed data attribute.

5. The system of claim 1, wherein said database selection interface further comprises at least one data field for receiving additional information in order to access said database.

6. The system of claim 5, wherein said additional information input includes a connect string.

7. The system of claim 5, wherein said additional information input includes a user ID.

8. The system of claim 5, wherein said additional input includes a password.

9. The system of claim 1, wherein edit field mapping interface includes an attribute label input for allowing said system user to assign a description to an attribute.

10. The system of claim 1 further including a data formatter for formatting data into a specified knowledge base format.

11. An automated method for mapping a plurality of database fields from an arbitrary ODBC-compliant database to a plurality of attributes in a knowledge base having a known data attribute format, said method comprising the steps of:

providing a database selection interface on a display associated with a system user, said database selection interface displaying at least one user-selectable database to map to said knowledge base having said known data attribute format;

selecting a database to map to said knowledge base from said at least one user-selectable database displayed on said database selection interface;

providing a data attribute mapping interface on said system user display, said data attribute mapping interface displaying a plurality of data attributes included in said knowledge base;

selecting at least one displayed data attribute to map to at least one data field in said arbitrary database;

providing an edit field mapping interface on said system user display, said edit field mapping interface displaying said at least one selected data attribute;

selecting a database field to map to each said displayed data attribute; and storing each said database field mapped to each said data attribute in a data map memory.

* * * * *